No. 648,141. Patented Apr. 24, 1900.
A. BELMONT.
INOXIDIZABLE CORRUGATED BLADE OR PLATE.
(Application filed July 26, 1899.)
(No Model.)
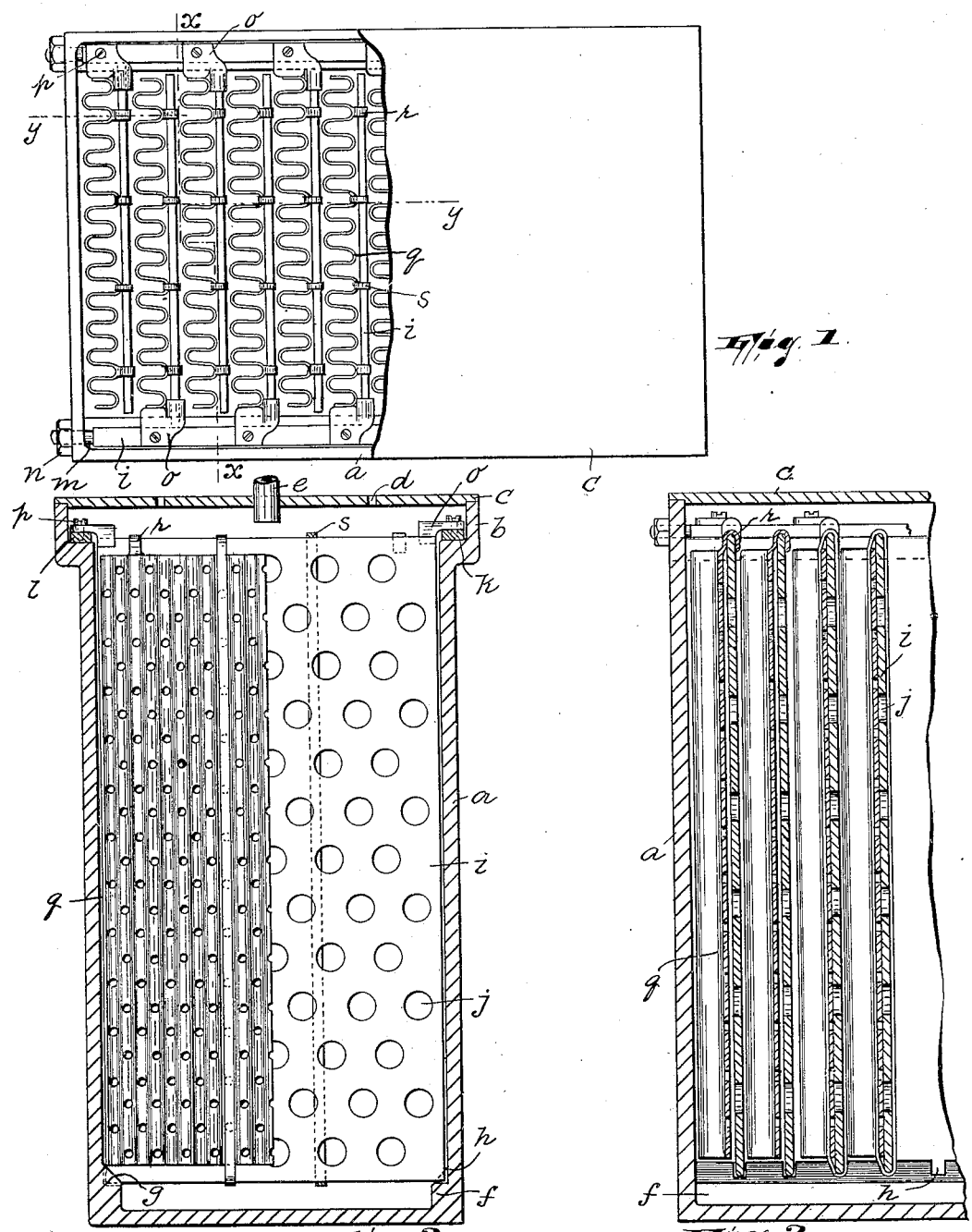
WITNESSES:
Wm. D. Bell
Robert J. Pollitt
INVENTOR,
Alphonse Belmont,
BY
Gartner & Steward
ATTORNEYS.

UNITED STATES PATENT OFFICE.

ALPHONSE BELMONT, OF PARIS, FRANCE.

INOXIDIZABLE CORRUGATED BLADE OR PLATE.

SPECIFICATION forming part of Letters Patent No. 648,141, dated April 24, 1900.

Application filed July 26, 1899. Serial No. 725,123. (No model.)

*To all whom it may concern:*

Be it known that I, ALPHONSE BELMONT, electrical engineer, a citizen of France, residing at 60 Rue de Provence, Paris, in the Republic of France, have invented certain new and useful Improvements in Inoxidizable Corrugated Blades or Plates for Accumulators or the Like; and I do hereby declare the following to be a full, clear, and exact description of the invention, such as will enable others skilled in the art to which it appertains to make and use the same, reference being had to the accompanying drawings, forming part of this specification.

This invention relates to electrical accumulators or secondary batteries; and its object is to provide a battery of this nature in which the sheets of lead or other metal constituting the battery-electrodes are so shaped, arranged, and sustained in the battery as to obtain from a cell of a given size the maximum energy and to render said electrodes easily removable from the battery and at the same time proof against undesired contact with each other.

The invention consists in the improved accumulator or secondary battery and in the combination and arrangement of its various parts, substantially as will be hereinafter pointed out and finally embodied in the clauses of the claim.

The invention is fully illustrated in the accompanying drawings, wherein corresponding letters of reference indicate like parts, and wherein—

Figure 1 is a view in elevation of my improved secondary battery, a portion of the cover therefor being broken away to show the internal structure thereof. Fig. 2 is a transverse sectional view on the line $x\,x$ in Fig. 1, and Fig. 3 is a longitudinal sectional view of one end of my improved battery as shown in Fig. 1 and taken on the line $y\,y$ in said figure.

In said drawings, $a$ designates a jar or other suitable receptacle, preferably composed of india-rubber or other non-conducting substance and having along the upper edges of its two side walls L-shaped flanges $b$, which support a cover $c$ on their upper edges. The cover $c$ may be perforated, as shown at $d$, to permit the escape of any gases which are generated, and it may be provided with a filling device $e$. Where the bottom wall and each side wall meet is formed a rib $f$, having an inclined upper surface $g$, and into each of these ribs is cut a series of rectangular notches $h$.

$i$ designates a series of plates composed of ebonite, porous earth, or other like rigid and inoxidizable material, each plate being substantially rectangular and provided with perforations $j$. Each of these plates approximately fits the inside of the jar $a$ and its lower corners are adapted to seat in the sockets $h$ of the ribs $f$, so as to be partially sustained thereby.

Each L-shaped flange $b$ provides at $k$ a seat for a metallic strip $l$, which may be secured in position in any desired manner. One end of each of these strips is reduced, as at $m$, and projects through one end wall of the jar, being provided with a nut $n$, and thus serving as a binding-post for the attachment of wires or other conductors.

Each inoxidizable plate $i$ is capped at one of its upper corners by a small metallic plate $o$, which projects over the strip $l$ and rests thereon, being adapted to be secured thereto by a screw $p$. The porous plates are divided up into two series of equal number, those of one series alternating with those of the other and each series of plates being connected, as above described, to one of the metallic strips $l$.

$q$ is a sheet or plate of lead or other material suitable for use as the metal electrode of the battery. Said sheet is corrugated, each fold or roll of the corrugation being of appreciable depth, as best shown in Fig. 1, so that though the sheet has no extraordinary area in elevation it has the maximum amount of acting surface. Said plates $q$ are of course connected to the metallic strips $k$, this being effected through the medium of the small plates $o$, to which they are soldered. Each sheet should also be perforated, as are the inoxidizable sheets $i$, the object in both cases being to facilitate the proper circulation of the liquid of the battery.

The metal sheets $q$ are provided along their upper edges with hooks $r$, that form integral projections thereof. Each metal sheet is adapted to be suspended upon an inoxidizable plate by means of its hooks, which engage the upper edges of said last-named sheet.

In order to keep each metal sheet in contact with its inoxidizable sheet, I provide elastic rubber bands $s$, which embrace the two sheets extending vertically around the same, and thus hold them together, said elastic bands thus permitting the full expansion of the metal as well as the electrolytic action on both faces of the corrugated metal sheet.

Having thus fully described my invention, what I claim as new, and desire to secure by Letters Patent, is—

1. In a secondary battery, the combination of a jar or other receptacle, and suitable electrodes comprising an inoxidizable plate and an oxidizable metallic plate and arranged in said receptacle, said metallic plate being provided with hooks engaging the inoxidizable plate and being thereby suspended on said plate, substantially as described.

2. In a secondary battery, the combination of a jar or other suitable receptacle, suitable electrodes comprising an inoxidizable plate and an oxidizable metallic plate and arranged in said receptacle, said metallic plate being provided with hooks engaging the inoxidizable plate and being thereby suspended on said plate, and elastic bands surrounding said plates and securing them together, substantially as described.

3. In a secondary battery, the combination of a jar or other suitable receptacle, metallic conducting-strips arranged therein, alternating inoxidizable plates and corrugated metallic plates also arranged therein, said plates being perforated, elastic bands surrounding and securing together said plates in pairs, each pair comprising a metallic plate and an inoxidizable plate, said pairs of plates being arranged in two series, and other plates connecting the metallic plates of each series with said conducting-strips, substantially as described.

4. In a secondary battery, the combination of a jar or other suitable receptacle, metallic conducting-strips arranged therein, alternating inoxidizable plates and corrugated metallic plates also arranged therein, said plates being perforated, elastic bands surrounding and securing together said plates in pairs, each pair comprising a metallic plate and an inoxidizable plate, said pairs of plates being arranged in two series, and other plates connecting the metallic plates of each series with said conducting-strips, the interior of said jar being provided with notched ribs adapted to receive the edges of said inoxidizable plates, substantially as described.

In testimony that I claim the foregoing I have hereto set my hand this 11th day of July, 1899.

ALPHONSE BELMONT.

Witnesses:
JOSEPH POUCHOL,
ADOLPHE A. NALLÉ.